(12) United States Patent  (10) Patent No.: US 7,556,656 B2
Watanabe et al.  (45) Date of Patent: Jul. 7, 2009

(54) BATTERY AND RELATED MANUFACTURING METHOD

(75) Inventors: Kyoichi Watanabe, Kanagawa-ken (JP); Hideaki Horie, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 380 days.

(21) Appl. No.: 11/357,151

(22) Filed: Feb. 21, 2006

(65) Prior Publication Data

US 2006/0141353 A1  Jun. 29, 2006

Related U.S. Application Data

(62) Division of application No. 10/287,637, filed on Nov. 5, 2002, now Pat. No. 7,429,431.

(30) Foreign Application Priority Data

Nov. 19, 2001 (JP) ............................ 2001-353499

(51) Int. Cl.
 *H01M 10/04* (2006.01)
(52) U.S. Cl. .................... 29/623.5; 29/623.1; 429/153
(58) Field of Classification Search ............... None
 See application file for complete search history.

(56) References Cited

U.S. PATENT DOCUMENTS

| 4,284,169 A | | 8/1981 | Tulloch |
| 4,538,697 A | | 9/1985 | Muroi et al. |
| 4,764,182 A | * | 8/1988 | Bish et al. .................. 29/623.1 |
| 5,586,994 A | * | 12/1996 | Hasegawa et al. .......... 29/623.5 |
| 5,800,942 A | | 9/1998 | Hamada et al. |
| 6,056,259 A | | 5/2000 | Lahham |
| 2003/0054239 A1 | | 3/2003 | Watanabe et al. |

FOREIGN PATENT DOCUMENTS

| EP | 0 771 037 A1 | 5/1997 |
| JP | 02-197446 A | 8/1990 |
| JP | 10-27591 A | 1/1998 |
| JP | 10-27599 A | 1/1998 |
| JP | 10-188927 A | 7/1998 |
| JP | 10-261440 A | 9/1998 |
| JP | 11-40204 A | 2/1999 |
| JP | 2000-149901 A | 5/2000 |
| JP | 2001-110377 A | 4/2001 |
| JP | 2001-196102 A | 7/2001 |
| JP | 2001-256934 A | 9/2001 |
| JP | 2001-307693 A | 11/2001 |
| JP | 2002-141114 A | 5/2002 |

* cited by examiner

*Primary Examiner*—John S Maples
(74) *Attorney, Agent, or Firm*—McDermott Will & Emery LLP (57) ABSTRACT

A method of manufacturing a battery is provided including the step of locating a plurality of unit cells in a support body having an opening portion. A plurality of jigs each having a convex portion and a bore are mounted at the support body so as to cause the convex portion to be fit into the opening portion of the support body. A spacing between the support body and the plurality of the unit cells is filled with a plastic resin by charging the plastic resin into the spacing between the support body and the plurality of unit cells through the bore of one jig of the plurality of jigs, while releasing air inside the support body through the bore of another jig of the plurality of jigs that is opposite to the one jig.

4 Claims, 8 Drawing Sheets

BATTERY AND RELATED MANUFACTURING METHOD

RELATED APPLICATIONS

This application is a divisional of U.S. patent application Ser. No. 10/287,637, filed on Nov. 5, 2002, now U.S. Pat. No. 7,429,431, which in turn claims the benefit of Japanese Application No. 2001-353499, filed on Nov. 19, 2001, the disclosures of which Applications are incorporated by reference herein.

BACKGROUND OF THE INVENTION

The present invention relates to a battery and a related manufacturing method and, more particularly, a battery and a related manufacturing method which have a structure in that, even when unit cells forming the battery tentatively produces gas, the gas is enabled to be discharged outside, and also a vibration proof structure which is able to shift a natural frequency to a high frequency range.

Japanese Patent Application Laid-Open Publications No. 2001-110377, 2000-149901 and H10-261440 disclose structures in which support bodies of batteries are equipped with respective safety valves in structures where gas is supposed to be produced.

Further, Japanese Patent Application Laid-Open Publications No. 2001-196102 and H11-40204 disclose structures adapted to monitor the temperature of internal cells for controlling the same to forestall gas production.

SUMMARY OF THE INVENTION

However, upon various studies conducted by the present inventors, although the structures provided such safety valves can be suitably used in the unit cell as a single element, the presence of the battery accommodating therein a plurality of unit cells provides a difficulty in determining the specification per se of internal pressure caused by gas produced from the unit cells and, so, it is hard to say that such related art structures are necessarily suited to be applied to the support body surrounding the unit cells.

On the other hand, when mounting the battery in the vehicle, since a measure should be undertaken for the battery to be exerted with vibration from outside, the battery should employ not only the structure for permitting gas to be discharged outside but also the vibration proof structure.

The present invention has been completed upon the studies set forth above and has an object to provide a battery and a related manufacturing method that have a gas releasing structure in which, even when gas is produced in a plurality of unit cells placed in the battery, the gas is discharged outside the battery while providing a vibration proof structure which withstands vibration to be exerted from outside for thereby achieving a compatibility of the gas releasing structure and the vibration proof structure.

According to a first aspect of the present invention, there is provided a battery comprising: a support body; a surface of the support body, a resonance being allowed in the surface; a plurality of unit cells located inside the support body; and an opening portion provided in the surface of the support body at a region involving a loop position of the resonance and communicating between an inside and an outside of the support body.

Stated another way, a battery of the present invention, comprising: a support body; a surface of the support body, a resonance being allowed in the surface; a plurality of unit cells located inside the support body; and means, which is provided in the surface of the support body at a region involving a loop position of the resonance, for communicating between an inside and an outside of the support body.

On the other hand, a method of manufacturing a battery of the present invention, comprising: locating a plurality of unit cells in a support body having an opening portion; mounting a convex shaped jig at the opening portion for sealing the support body; and causing a spacing between the support body and the plurality of the unit cells to be filled with a plastic resin.

Other and further features, advantages, and benefits of the present invention will become more apparent from the following description taken in conjunction with the following drawings.

DETAILED DESCRIPTION OF THE PREFERRED EMBODIMENT

Before entering into detailed description of various testing contents and various examples of the present invention, a battery of an embodiment of the present invention and a related manufacturing method are briefly described hereinafter with suitable reference to the accompanying drawings.

Also, the battery of the embodiment includes a plurality of rows of series connected unit cells, each serving as a secondary battery, with such rows being further connected in parallel to realize a structure with a large power output and a large capacity which is specifically suited for use as a battery for an HEV (Hybrid Electric Vehicle), which requires a large capacity with a large power output and operates in a cycle in which charging and discharging of the battery are repeated, or an FCV (Fuel Cell Powered Vehicle) as well as a battery with 12V or 24V for an automobile. However, it should be noted that the present invention is not limited to exemplary structures, testing samples and examples of the embodiment described below.

(Structural Overview)

Figure 1:
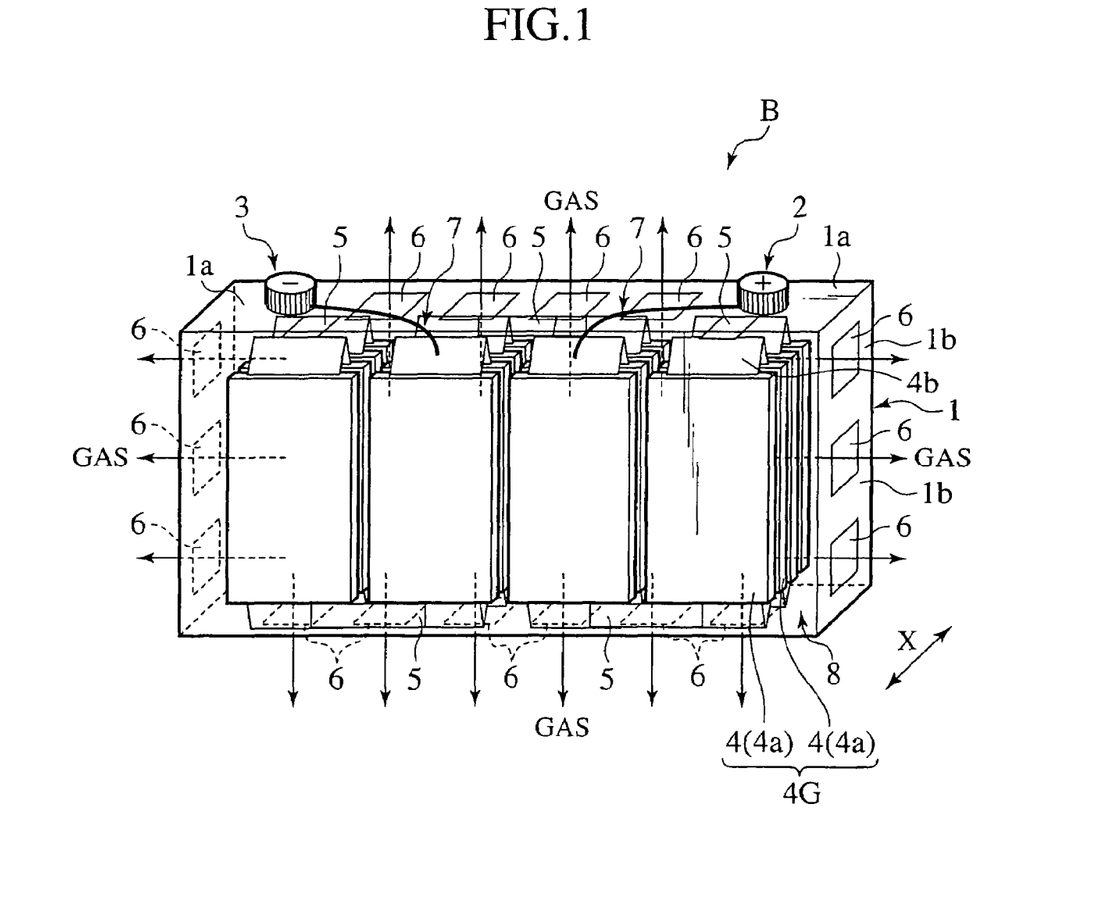
FIG. 1 is a schematic perspective view of a structural body of a battery of an embodiment according to the present invention.

FIG. 1 shows a battery B comprised of unit cell groups 4G, composed of the unit cells 4 connected in two parallels, which are connected in eight series.

As shown in FIG. 1, the battery B is comprised of an outer case 1, which serves as a support body, a positive terminal 2, a negative terminal 3 and unit cells 4. The unit cell 4 has a cell body 4a and tabs 4b that form electrodes, with the unit cell groups 4G being connected to one another via bus bars 5. A plurality of opening portions 6 are formed in a top wall 1a, a side wall 1b and in walls opposing to the respective walls. Also, reference numeral 7 designates a lead wire that connects the tab 4b and the terminal to one another, and reference numeral 8 designates plastic resin group. Of course, it is to be possible for such a battery to be structured with a combination of m-series and n-parallel (wherein m is an integer of m≧1 and n is an integer n≧2).

Figure 2A:
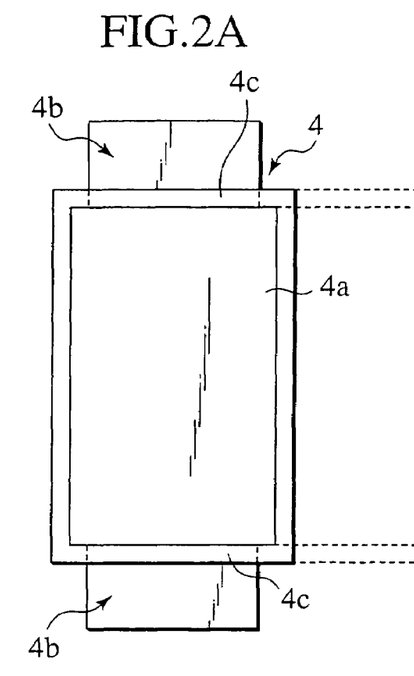
FIG. 2A is a top view of a unit cell to be placed in the battery of the present embodiment.
Figure 2B:
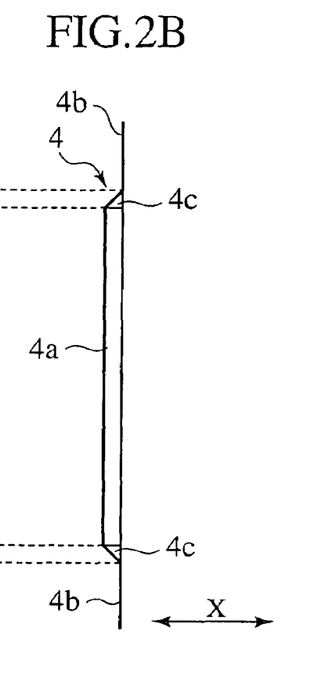
FIG. 2B is a side view of the unit cell shown in FIG. 2A.

FIGS. 2A and 2B show a top view and a side view of each of the unit cells 4, respectively.

Figure 3A:
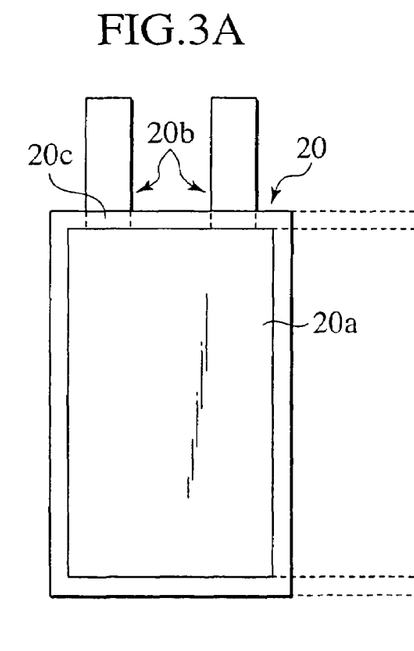
FIG. 3A is a top view of another example of a unit cell to be placed in the battery of the present embodiment.
Figure 3B:
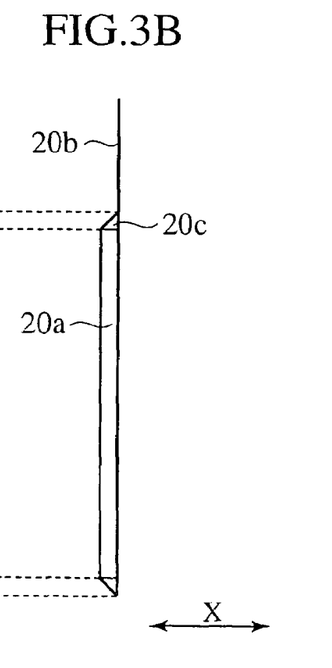
FIG. 3B is a side view of the unit cell shown in FIG. 3A.

In FIG. 2A, the unit cell 4 is comprised of the cell body 4a, and the tabs 4b formed at both ends of the cell body 4a to form the respective electrodes. Of course, the tabs are not limited to such particular structures and may be modified to have a structure as shown in FIGS. 3A and 3B which show a top view and a side view of each unit cell 20, respectively, i.e., a structure in which only one distal end of the cell body 20a is provided with the tabs 20b forming the electrodes. Also, a reference numeral 4c designates bonded portions of the tabs 4b and a reference numeral 20c designates bonded portions of the tabs 20b, respectively.

Here, as mentioned above, the plural opening portions 6 are formed in the top wall 1a, the side wall 1b and the opposing walls. The opening portions are effective for gas, which would be generated from the unit cells 4, to escape outside, while the presence the opening portions 6 passing through the outer case 1 allows a natural frequency of the outer case 1 to be varied.

Now, such a technical standpoint is described below in detail.

(Shift Function of Natural Frequency to High Frequency Side)

Figure 4A:
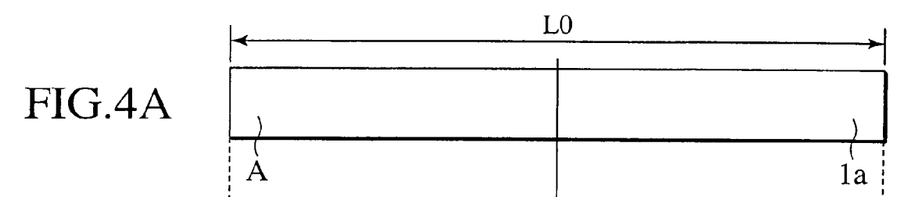
FIG. 4A is a top view of a support body with no opening portion of the battery of the present embodiment, each of FIGS. 4B and 4D is a typical view illustrating a resonating condition of the structure with no opening portion corresponding to FIG. 4A.
Figure 4B:
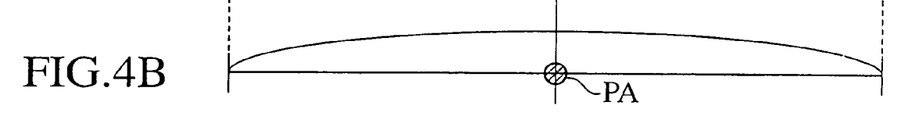
Figure 4C:
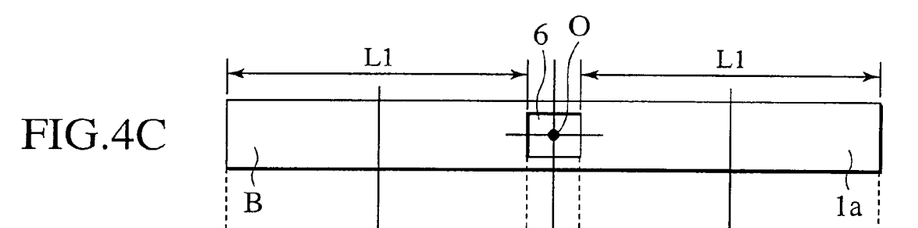
FIG. 4C is a top view of a support body with an opening portion of the battery of the present embodiment.
Figure 4D:
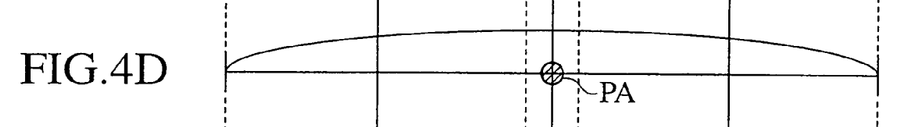
Figure 4E:
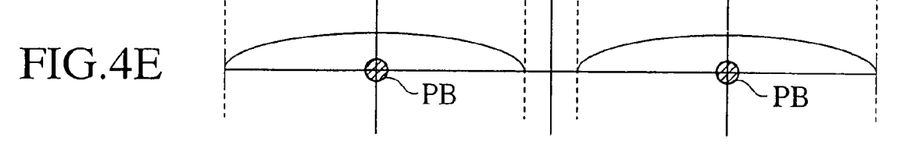
FIG. 4E is a typical view illustrating a resonating condition of the structure with the opening portion corresponding to FIG. 4C.

FIGS. 4A and 4B show a top view of a structure (hereinafter suitably referred to as a structure A) of the outer case 1, in which no opening portion is formed in the top surface 1a of the outer case 1, and a loop position PA of a resonance generated in such a structure, respectively. FIGS. 4C to 4E show a top view of a structure (hereinafter suitably referred to as a structure B) of the outer case 1, in which a single opening portion 6 is formed in the top surface 1a of the outer case 1, the loop position PA identical with that of FIG. 4B for reference and loop positions PB of a resonance generated in the structure B, respectively.

With the structure A shown in FIGS. 4A and 4B, the loop position of the surface resonance is formed at a position where a vibration has a large amplitude in a surface resonance of the outer case 1. As a result, as the structure B shown in FIGS. 4C and 4E, the opening portion 6 is formed at the loop position of a first-order natural frequency that would occur when no opening portion is formed at the top surface 1a, and therefore, such a portion is prevented from serving as the loop of the resonance, thereby enabling the top surface to have a minimized amplitude of resonance and resulting in an improved anti-vibration effect.

That is, as shown in FIG. 4A, with the usual outer case 1 with no opening portion is apt to undergo a first-order resonance with a ½ wavelength of L0 to form the loop of the first-order resonance at the central area PA. On the contrary, as shown in FIG. 4C, forming the opening portion 6 at the loop position PA of the first-order resonance causes the opening portion 6 to function as a node of a surface resonance as viewed in FIG. 4E so as to cause the first-order resonance of ½ wavelength of L1 to appear at both sides of the opening portion 6. Here, L1<L0, and therefore, the resonance frequency is shifted to the high frequency range, thereby resulting in a remarkable reduction in sounds and noises to be caused by vibrations at a low frequency.

Figure 5A:
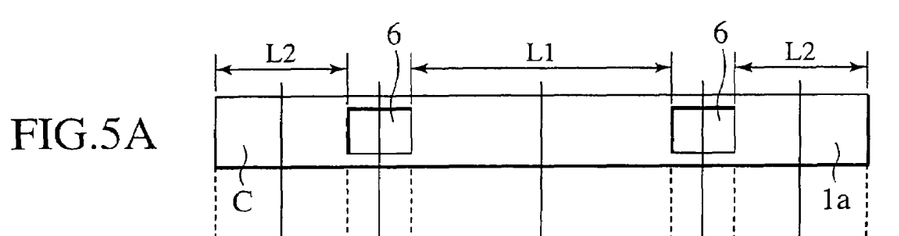
FIG. 5A is a top view of an another example of a support body with opening portions of the battery of the present embodiment.
Figure 5B:
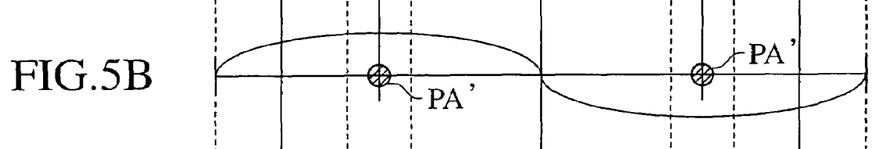
FIG. 5B is a typical view illustrating a resonating condition of the structure with no opening portion corresponding to FIG. 4A.
Figure 5C:
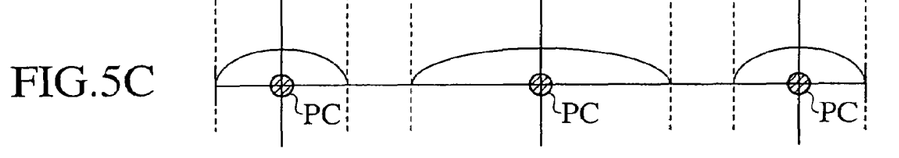
FIG. 5C is a typical view illustrating a resonating condition of the structure with the opening portions corresponding to FIG. 5A.

FIGS. 5A to 5C show a top view of a structure (hereinafter suitably referred to as a structure C) with opening portions 6 formed in the top surface 1a of the outer case 1 at loop positions of a second-order resonance that would occur when no opening portion is formed in the top surface 1a, loop positions PA' appearing during resonating under the structure A with no opening portion formed in the top surface 1a for reference and loop positions PC appearing during resonating under the structure C, respectively.

As shown in FIGS. 5A and 5C, forming the opening portions 6 at two positions causes the top surface 1a of the outer case 1 to be divided into three regions, with such individual regions being to be resonated, and therefore, the first-order resonance appears at a region L1 between the opening portions 6, and at regions L2 between the opening portions 6 and distal ends of the top surface 1a, respectively. Here, since the wavelengths of resonance appearing in the regions L1 and L2 are different from one another, two resonance frequencies newly appear, however, any of these resonance frequencies shifts to a high frequency range, thereby resulting in a remarkable reduction in sounds and noises to be caused by vibrations at a low frequency.

Figure 6:
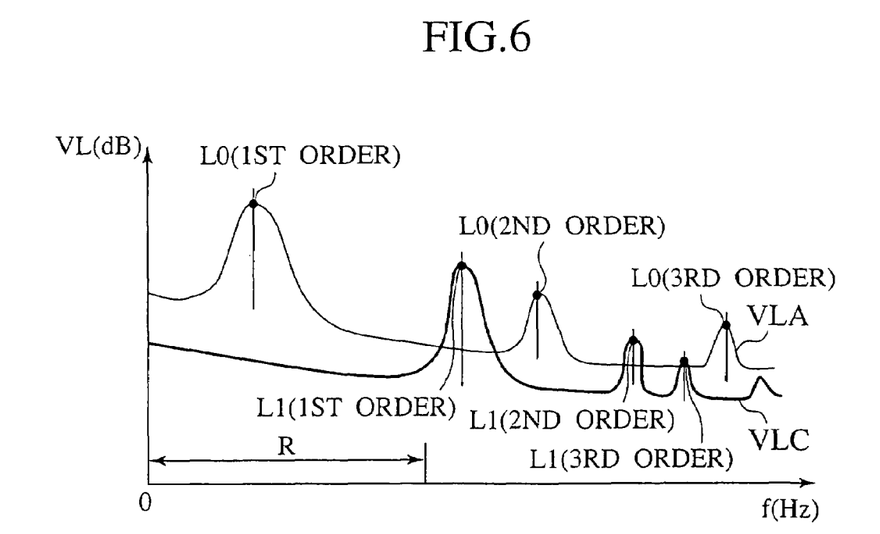
FIG. 6 is a graphical representation of a resonance frequency distribution pattern of the support body with the opening portions of the present embodiment shown in FIG. 5A, while referring to the support body with no opening portion of the present embodiment shown in FIG. 4A.

FIG. 6 shows a natural vibration spectrum diagram plotted with measured natural frequencies appearing in the structure C that includes the outer case 1 formed with the two opening portions 6 as shown in FIG. 5A, while accompanying with a natural vibration spectrum diagram plotted with measured natural frequencies appearing in the structure A that includes the outer case 1 formed with no opening portion as shown in FIG. 4A.

In FIG. 6, the axis of abscissa indicates a frequency f and the axis of ordinates indicates a vibration level VL. As shown in FIG. 6, a thin solid line VLA represents a natural vibration spectrum of the structure A having the outer case 1 with no opening portion, and a thick solid line VLC represents a natural vibration spectrum of the structure C having the outer case 1 formed with the opening portions 6. With the structure A, the resonance frequency appearing at a first time instant remains at a peak L0 (first-order), however, with the structure C, such a peak of L0 (first-order) initially appearing at the low frequency range shifts to a peak position of L1 (first-order) that exceeds a frequency range of vibration to be caused in a frequency range R under an actual environment in which the battery is practically used, and also such a phenomenon is similarly observed as to a peak L0 (second-order) and another higher peaks subsequent to such a peak L0 (second-order). Hence, no resonance occurs in the battery under such an actual environment, thereby resulting in an increase in an anti-vibration effect in such an actual environment. Also, though not shown, the structure C having the outer case 1 formed with the two opening portions 6 causes not only the resonance peak of L1 (first-order) but also that of subsequent L2 (first-order) to appear in detail, however, since these resonance peaks remain in a frequency range apart from that of such an actual environmental range, it is of course apparent that no resonance occurs in the battery under such an actual environment.

Figure 7A:
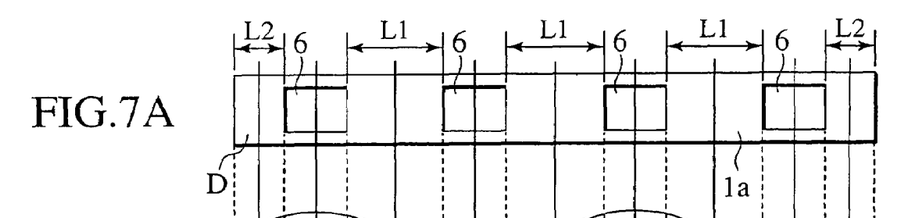
FIG. 7A is a top view of another example of a support body with opening portions of the battery of the present embodiment.
Figure 7B:
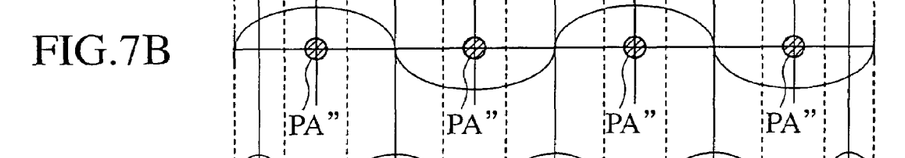
FIG. 7B is a typical view illustrating a resonating condition of the structure with no opening portion corresponding to FIG. 4A.
Figure 7C:
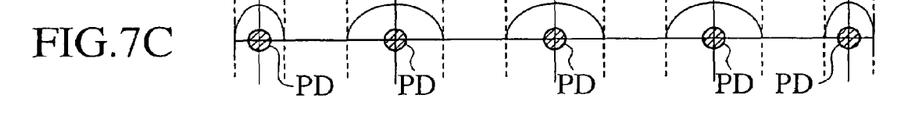
FIG. 7C is a typical view illustrating a resonating condition of the structure with the opening portions corresponding to FIG. 7A.

FIGS. 7A to 7C show a top view of a structure (hereinafter suitably referred to as a structure D) with opening portions 6 formed in the top surface 1a of the outer case 1 at loop positions of a fourth-order resonance that would occur when no opening portion is formed in the top surface 1a, and loop positions PA'' appearing during resonating under the structure A with no opening portion formed in the top surface 1a for reference and loop positions PD appearing during resonating under the structure D, respectively.

As shown in FIGS. 7A and 7C, forming the opening portions 6 at four positions causes the top surface 1a of the outer case 1 to be divided into five regions, with individual regions to be resonated, and therefore, the first-order resonance corresponding to the regions L1 and L2 come to occur. Here, since the wavelengths of resonance appearing in correspondence to the regions L1 and L2 are different from one another, two resonance frequencies newly appear, however, any of these resonance frequencies shifts to the high frequency range, in contrast to that of the structure A with no opening portion, to preclude sounds and noises, resulting from the vibrations at the low frequency, to be effectively reduced.

Figures 8A, 8B, 8C:
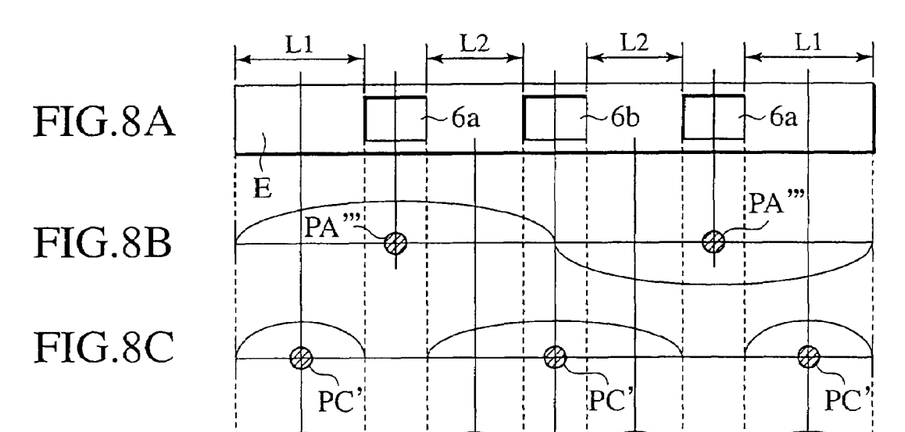
FIG. 8A is a top view of another example of a support body with opening portions of the battery of the present embodiment.
FIG. 8B is a typical view illustrating a resonating condition of the structure with no opening portion corresponding to FIG. 4A.
FIG. 8C is a typical view illustrating a resonating condition of the structure corresponding to FIG. 8A, with opening portions only partially formed.

FIGS. 8A to 8C show a top view of a structure (hereinafter suitably referred to as a structure E) with two opening portions 6, which are formed in the top surface 1a of the outer case 1 at loop positions of the second-order resonance that would occur when no opening portion is formed in the top surface 1a, and also with an additional opening portion 6, which is formed at an intermediate position between such two opening portions 6, loop positions PA''' appearing during resonating under the structure A with no opening portion formed in the top surface 1a for reference, loop positions PC' during resonating under the structure C with the two opening portions 6a formed at the loop positions of the second-order resonance that would occur in the structure A with no opening portion formed in the top surface 1a for reference and loop positions PE appearing during resonating under the structure E, respectively.

Figure 8D:
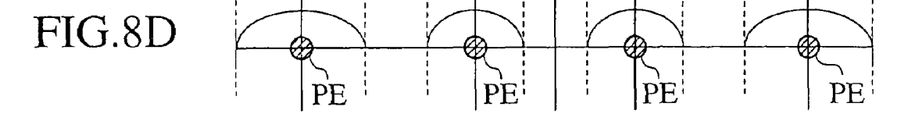
FIG. 8D is a typical view illustrating a resonating condition of the structure with the opening portions corresponding to FIG. 8A.

As shown in FIG. 8A in part and FIG. 8C, it is conceivable that, first, with the structure having the openings 6a formed at the two positions, there is a provability in which the resonance with the natural frequency corresponding to the length between the two opening portions 6a, 6a appears at the low frequency range. Since, in this instanced, in order to shift the resonance of the low frequency to the high frequency range, as shown in FIGS. 8A and 8D, the structure E is realized which newly includes the opening portion 6b in addition to the opening portions 6a, 6a. As a result, with the structure E in which the opening portions 6a, 6a and 6b are formed in the top surface 1a of the outer case 1, the resonance frequency is shifted to the high frequency range, and therefore, sounds and noises to be caused due to vibrations of the low frequency are effectively reduced.

As previously noted above, shifting the natural frequency of the battery to the high frequency range enables the outer case 1, which forms the support body of the units cells, not to reach a resonance point in a practical environment where the battery is actually used, and therefore, such a resultant battery is improved in an anti-vibration effect. Especially, with the battery to be applied to a vehicle which needs to take a measure for an anti-vibration effect, forming the outer case 1 with no opening portion typically induces a first-order natural frequency along the maximum length (i.e., along the longest length of the surface when implementing a comparison between the length of the surface in a longitudinal direction and that of the surface in a lateral direction) of the surface of the outer case 1. For this reason, if the battery is exerted with vibrations at a frequency range of 50 to 200 Hz that would occur on the vehicle in a practical use, this frequency range involves the first-order natural frequency of the outer case 1, thereby causing the resonance to occur. This results in an increased provability in breakage of the tabs 4b of the unit cells 4 or damage of the coverings of the unit cells 4. To this end, the opening portion 6 is formed in the outer case 1 that serves as the support body of the battery to cause the surface of the case to be divided with the opening portion 6 into several pieces along the maximum length of the surface, and therefore, the natural frequency is shifted to the high frequency range. For this reason, the outer case 1 formed with the opening portion 6 does not have the resonance frequency which falls in the frequency range that would practically occur in the vehicle such that no excessive magnitude of vibration is applied to the internal unit cells 4 and, accordingly, the outer case 1 effectively serves as an anti-vibration structure.

Also, it is needless to say that the present invention is not limited to the exemplary structures set forth above and any other alternative one may be employed which includes a structure formed with a plurality of openings in the same concept as that of the previously discussed.

(Position and Size of Opening Portion)

As shown in FIGS. 4C and 4D representatively, it is preferred for the opening 6 to be formed in the top surface 1a such that the loop position of the resonance in the top surface 1a of the structure A with no opening is positioned at a center O of the opening portion 6. This is because of the fact that locating the center of the opening 6 at a position in which the resonance has the maximum amplitude enables the resonance frequency to be shifted to the higher frequency range in the most effective way.

Further, in an actual practice, it is of course needless to say that although there is a provability in which the position of the opening is displaced more or less from a setting position, the loop position of the resonance and the center of the opening may not be necessarily and strictly aligned with respect to one another and, by positioning the loop position at an approximately center of the opening, it is possible to obtain the substantially similar result as set forth above. This is due to the fact that even though the presence of more or less displacement in the setting positions of the openings causes a little difference to occur in a degree of such a result, the resonance frequency per se can be shifted.

Further, it is specifically desired for setting position of the loop position of such resonance to be settled at a location which, in a consideration of the shape of the opening portion, is aligned to a centroid determined in view of the shape of the opening. Also, although it is mostly effective for the resonance position to be shifted with the opening portion selected to have a substantially square shape, the present invention is not limited to such a particular detail. This is because of the fact that the presence of the suitably shaped opening per se, despite a particular shape such as substantially circular, elliptical, rectangular and other polygonal shapes, provides a capability of shifting the resonance frequency and, hence, a similar effect is obtained to be more or less.

(Action Caused by Plastic Resin)

Figure 9A:
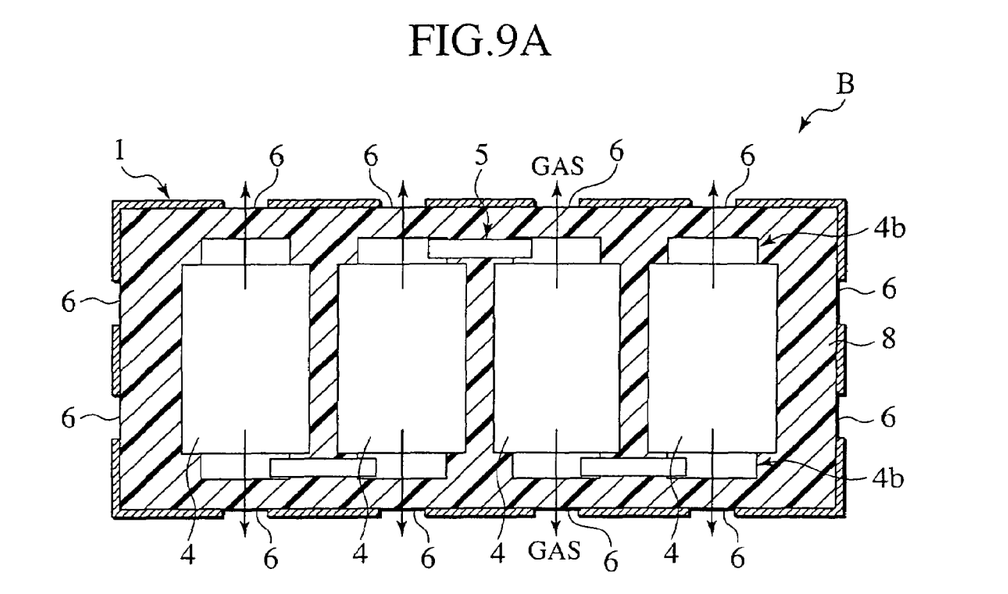
FIG. 9A is a cross sectional view of the battery of the present embodiment.

FIG. 9A is a cross sectional representation of the outer case 1, filled with a plastic resin group 8 in an area except for the unit cells 4, corresponding the side view of FIG. 1.

In FIG. 9A, the outer case 1 serving as the support body has an inner space, except for the units cells 4, filled with the plastic resin group 8 composed of at least more than one resin material. Such a plastic resin group 8 provides a so-called damping effect with respect to a resonance peak of the outer case 1 serving as the support body and has an effect to reduce the amplitude of the resonance frequency. This results in a further reduction in the amplitude of a newly shifted resonance peak caused by the opening portions 6, providing a capability of restraining an amplitude level of an entire structure of the battery.

Figure 9B:
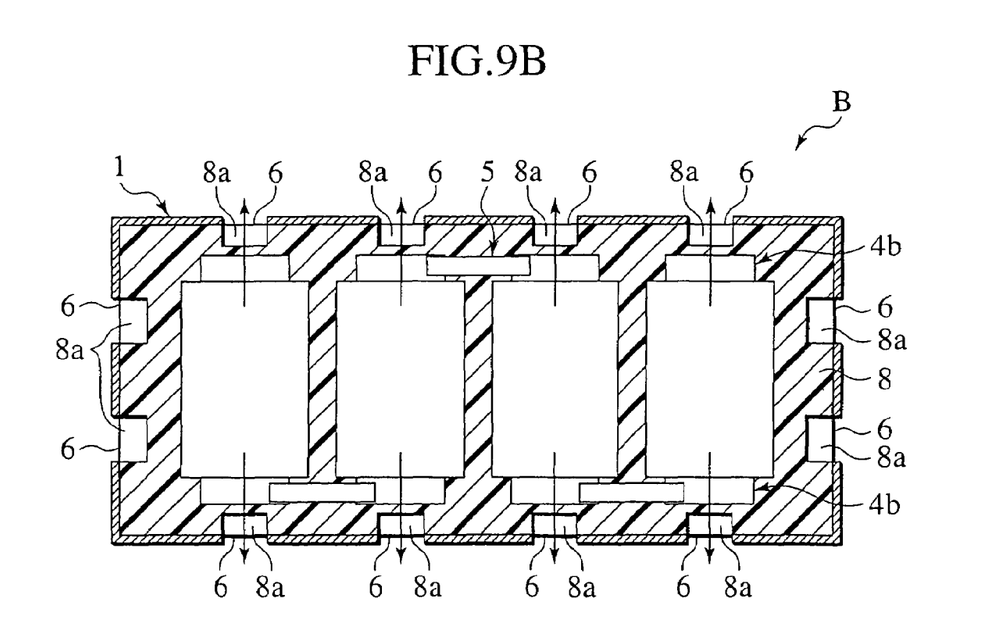
FIG. 9B is a cross sectional view of another example of the battery of the present embodiment.

As shown in FIG. 9B, further, the plastic resin group 8 may be preferably provided, at rear side areas of the opening portions 6, with cavity portions 8a which are inwardly indented toward the unit cells 4. This is due to the fact that the provision of the cavity portions 8a formed at areas in which gas is produced from the unit cells 4 enables the gas to be discharged at a higher efficiency than an efficiency of gas discharged in a structure, in which no cavity portions are formed as shown in FIG. 9A, bearing a long distance between an area at which the gas is produced and the opening portion.

The plastic resin for forming the plastic resin group to be filled may be preferably selected from a group consisting of epoxy series resin, urethane series resin, nylon series resin and olefin series resin in a single or in combination thereof. The plastic resin group to be inserted inside the battery has functions not only to eliminate vibrations from being transmitted to the unit cells but also to protect the unit cells from outer environments and, to this end, needs to have various performances such as a water proof, a moisture proof, a hot and cold cycle property, a heat resistant stability, an insulating property and a fire retardant property. In order for these performances to be satisfied, epoxy series resin, urethane series resin, nylon series resin and olefin series resin may be preferable among other resin materials. Also, urethane series resin may be particularly preferable because of such excellent performances.

Further, the plastic resin group may, of course, include other resin materials such as silicone rubber and olefin series elastomer if these resin materials satisfy the performances set forth above, providing a capability of obtaining an effective vibration proof.

Further, it is effective to combine a plurality of these plastic resins so as to provide a composite resin. This is because that anti-vibration effect is more effectively realized by arranging such preferable plastic resins at several areas of the outer case serving as the support body.

(Dimensional Conditions Such as Thickness of Unit Cell)

The unit cell 4 may preferably be of a so-called thin type laminated cell which has a smaller thickness, in a direction (a direction X shown in FIG. 1, 2B or 3B) in which the electrodes 4b, 20b are stacked inside the battery, respectively, than thickness in other directions. Thus, a thickness direction of the unit cell 4 is defined as the direction in which the unit cell 4 has such a smaller thickness. Also, such a smaller thickness is defined as a thickness of the unit cell 4. Although the thin type laminated unit cell may preferably have a thickness in a range of 1 to 10 mm, the present invention is not limited to such a particular dimension. The battery takes the form of a structure in which the unit cells 4 in small units are efficiently collected to provide a battery with a large capacity at a high output voltage and, in order for the resonance point of the case of the battery to be shifted, the battery may be preferably comprised of the laminated type battery with an outer surface covered with a plastic resin. This is due to the fact that the presence of the outer surface covered with a high polymer material such as nylon allows the unit cell 4 to have a lower dynamic spring constant than that of a can type battery to effectively provide an improved anti-vibration performance.

Further, with such a structure even employing the plastic resin group 8, since the unit cells 4 fall in an environment with a periphery formed with the same resin material, adjacent component parts are apt to get intimate with one another in materials, thereby resulting in another advantage in that it becomes hard for an interfacial debonding to occur between the unit cell 4 and the plastic resin group 8 owing to a vibrational deterioration.

Further, in view of a heat dissipation property, since heat is easily apt to internally accumulate in the unit cell with a thickness beyond a given value whereas, even with a too thin structure, a difficulty is encountered in enhancing a desired battery capacity, it is preferable to select the laminated type battery with an appropriate value of thickness depending on such requirements.

In consideration of the above views, a thin type laminated battery with the thickness in a range of 1 to 10 mm is well worthy of a suitable unit cell 4 and provides not only a vibration reduction effect but also high performances such as the heat dissipating property while eliminating various other deteriorations.

(Position of Opening Portion Related to Gas Discharging Action)

Typically, the opening portion or portions 6 may be preferably formed in at least more than one surface of the outer case 1 (such as the top surface 1a, the side surface 1b and other surfaces opposed to the top and side surfaces) that is parallel to the thickness direction (the direction X shown in FIG. 1, 2B or 3B) of the unit cell 4 inside the battery. Since a safety valve (not shown), which is for gas generated in the unit cell 4, or a lamination sealed portion, which is provided when the laminated cell is employed and from which gas generated in the unit cell 4 tends to escape, is substantially located to face in a direction perpendicular to the thickness direction of the unit cell 4, the gas tends to emit and escape in such a direction perpendicular the thickness direction.

Consequently, in order for the gas generated from the unit cell 4 to be efficiently discharged outside the battery, the position of the opening portion 6 to be arranged in the outer case 1 may be preferably determined to be located in at least more than one surface among the four surfaces parallel to the thickness direction of the unit cell.

Here, in a case where the positions of such safety valves of the units cells 4 are aligned in one direction, or in a case where, as shown in FIGS. 3A and 3B, the tab bonded portion 20c of the laminated unit cell is formed in one direction, a direction in which gas is caused to emit becomes one direction and, hence, the opening portion or portions 6 may be formed in one surface. However, as shown in FIGS. 2A and 2B, in a case where gas does not emit in one direction, i.e., gas is discharged in a non-steady state, there are many uncertainties as to from which gas is produced, and therefore, the opening portion or portions 6 may be preferably formed in the plural surfaces.

Further, it is desirable for each opening portion 6, which is to be formed in the outer case 1 serving as the support body, to be located at position on a so-called foot of vertical line in the surface nearest from its corresponding safety valve or from its corresponding tab bonded portion 4c, 20c of the unit cell 4 along the direction in which gas is discharged with the shortest distance. This is because of the fact that the presence of a short distance in a delivery path of gas to be discharged is effective for causing gas produced from the unit cell 4 to be efficiently discharged outside the outer case 1 of the battery. That is, if the delivery path of the gas is long, the gas tends to flow into various undesired regions within the battery, with a resultant increase in provability to undesirably cause the outer case 1 to be filled with the gas.

Thus, it becomes clear that each opening portion 6 may be preferably located at the position on the foot of vertical line in the surface that is closest to the safety valve or to the tab bonding portion of the laminated cell, at which the gas tends to emit from the unit cell 4, with the shortest distance. Here, in a situation where a difficulty is encountered in locating each opening portion at the most appropriate position due to some other factors, it may be sufficient for the opening portion to be located at the position as close as possible to the appropriate position.

(Application of Battery to Vehicle)

When applying the battery of this embodiment to the vehicle, it becomes possible for the battery to have the resonance frequency displaced from the frequency range of the vibration that would occur in the vehicle. Although it is practically impossible to remove the resonance frequency from the vehicle equipped with a mass-spring system with the degree of multiple freedom, the battery of the presently filed embodiment has a capability of causing the resonance frequency of the battery to be shifted from the frequency range that would result from the vehicle, and such a battery has no provability of reaching the resonance frequency.

More particularly, since frequencies of booming noises internally generated in the vehicle at a low frequency below 150 Hz may become a cause of a sound with a discomfort feeling to be imparted to a vehicle occupant, the resonance with such a frequency range requires to be displaced. Further, since the sound with such a frequency range is hard to be absorbed with an acoustical material, such sound is apt to be particularly actualized. As a consequence, by shifting a sound source with a frequency falling in such a range to a frequency range beyond a critical range, i.e., a specific frequency range of above 200 Hz, the sound falling in the discomfort frequency range can be effectively prevented. Further, the higher the frequency in the high frequency range, the bigger will be the effect per se of the acoustic material, with a resultant capability of attaining a further effective vibration resistance.

Accordingly, applying the battery of the presently filed embodiment to the vehicle enables not only the heat-resistance but also the vibration resistance, to be of specifically importance to the battery for the vehicle, to be sufficiently enhanced.

(Manufacturing Method for Battery)

Now, a manufacturing method for the battery of the presently filed embodiment is described below in detail.

Figure 10:
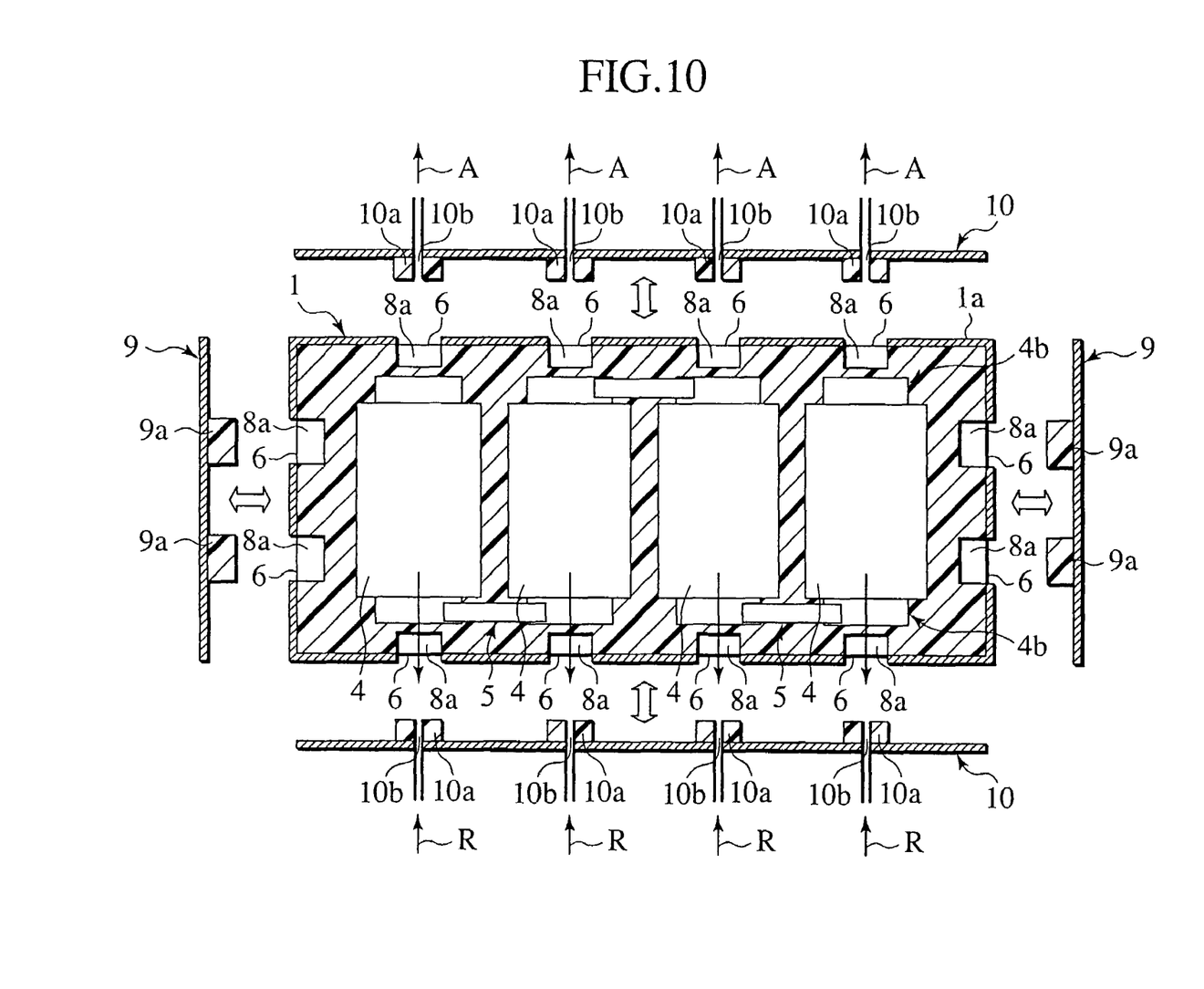
FIG. 10 is a typical representation for illustrating a method of manufacturing the battery of the present embodiment.

FIG. 10 is a cross sectional representation for illustrating the manufacturing method for the battery representatively shown in FIG. 9B.

As shown in FIG. 10, a first sealing jig 9 is prepared at the side wall 1b of the outer case 1 for an installation and removal capability and has convex portions 9a that seal the opening portions 6 of the side wall 1b. The first sealing jig 9 is provided because of the fact that, when filling the plastic resin group 8, since the plastic resin remaining in a substantially liquid state leaks through the openings 6, there is a need for causing the opening portions 6 to be temporarily sealed to preclude the liquid state plastic resin from being leaked. Also, in order to properly fill the plastic resin in an efficient manner, a second sealing jig 10 is prepared at the top wall 1a of the outer case 1 for an installation and removal capability and has convex portions 10a that seal the opening portions 6 of the top wall 1a while having through bores 10b serving as an inlet and outlet to allow air and the plastic resin to pass therethrough. Here, in order for the cavity portions 8a to be formed at the rear side areas of the opening portions 6, the convex portions 9a, 10a double as molds for forming the cavity portions 8a and, therefore, simultaneously have a capability of setting the molds for the cavity portions 8a. In addition, the convex portions 10a have a capability of forming the cavity portions 8a, charging the plastic resin and correspondingly releasing the air at one time, thereby resulting in an improvement over a manufacturing efficiency.

Subsequently, after the first and second sealing jigs 9, 10 are mounted such that the convex portions 9a, 10a are fit into the opening portions 6 of the outer case 1 serving as the support body to allow the outer case 1 to be sealed whereupon, the plastic resin is charged through the through bores 10b at the lower side opposed to the top wall 1a in directions as shown by arrows R while releasing the air through the through bores 10b at the top wall 1a side in directions as shown by arrows A, and a spacing between the outer case 1 and the unit cells 4 is filled with the plastic resin to form the plastic resin group 8 therein.

Then after the plastic resin group 8 has been sufficiently hardened, in next step, removing the first and second sealing jigs 9, 10 allows the battery to be finally produced.

Also, with the forming step set forth above, although a method is employed to charge the plastic resin from the lower side against the gravity while releasing the air from the inner side of the case, the present invention is not limited to such a particular charging method and may suitably adopt other techniques such as a method of causing the plastic resin to drop from an upper area using a gravity drop and a method of charging the plastic resin subsequent to reducing pressure inside the battery.

Now, experimental results conducted with the structure discussed above with respect to characteristic tests are described hereinafter in detail.

(Test Contents)

The following tests have been conducted based on the batteries obtained in Examples 1 to 6, a Comparative Example and a Usual Example.

Hammering Test

Acceleration pick-ups are placed at center areas of the respective support members (outer cases) of the batteries manufactured in the respective Examples, the Comparative Example and the Usual Example, and measurements have been conducted for vibration spectrums of the acceleration pick-ups upon hammering a portion of each support body with the use of an impulse hammer. Such a setting method is carried out on the basis of JISB 0908 (defined for a correction method and a basic concept for vibration and an impact pick-up). Resulting measured spectrums are analyzed with FFT analyzer and are converted into dimensions of a frequency and an acceleration to obtain resonance spectrums. The resulting resonance spectrums contain a frequency that appears at the lowest frequency and is treated as the first-order resonance frequency.

And, the resulting first-order resonance frequency below 150 Hz is judged to be NG (unfavorable) in view of a noise and vibration performance and also the resulting first-order resonance frequency equal to or above 150 Hz is judged to be OK (favorable) in view of the noise and vibration performance.

Air Flow Test

An air ejector is placed at each position in which the unit cells are to be located inside each of the batteries manufactured in the respective Examples, the Comparative Example and the Usual Example, and an air flow meter is placed outside the support body (outer case) to measure the ratio between the flow rate of air ejected from the air ejector and the flow rate of air flowing outside the outer case.

And, a case where the resulting ratio of the air flow rate equal to or beyond a value of 50% is judged to have a ventilation property represented with ○ (favorable), and a case where the resulting ratio of the air flow rate below a value of 50% is judged to have the ventilation property represented with X (unfavorable).

EXAMPLE 1

This Example concerns to the structure B previously mentioned above.

In particular, as shown in FIG. 4C, a single opening portion 6 is formed only in one surface, i.e., the top surface 1a of the outer case serving as the metallic support body. Located inside the outer case are unit cells respectively concealed in aluminum cans and arranged in two rows with eight series to form the battery.

And, when conducting the measurement for the natural vibration spectrum of the outer case of such a battery by means of the hammering test, a first-order peak frequency of the resonance falls in a range of approximately 200 Hz with a favorable noise and vibration property. Also, conducting the test for air flowing from the unit cells to the outside of the outer case results in a confirmation of the ventilation falling in the favorable condition.

EXAMPLE 2

This Example concerns to the structure C previously mentioned above.

In particular, as shown in FIG. 5A, two openings 6 are formed only in one surface, i.e., the top surface 1a of the outer case serving as the metallic support body. Subsequently, the opening portions 6 of the outer case are sealed with a metallic plate to avoid a leakage. Under such a situation, the unit cells, formed in the laminated packages as shown in FIGS. 2A and 2B, are placed in the outer case in two rows with eight series, and the urethane resin is charged into the outer case whereupon the resin is hardened to form the battery.

And, when conducting the measurement for the natural vibration spectrum of the outer case of such a battery by means of the hammering test, a first-order peak frequency of the resonance falls in a range of approximately 220 Hz with a favorable noise and vibration property. Also, conducting the test for air flowing from the unit cells to the outside of the outer case results in a confirmation of the ventilation falling in the favorable condition.

EXAMPLE 3

This Example concerns to the structure D previously mentioned above.

In particular, as shown in FIG. 7A, a battery is manufactured in the same way as the Example 2 except for that four opening portions 6 are formed only in one surface, i.e., the top surface 1a of the outer case serving as the metallic support body and the unit cells 20, formed in the laminated packages as shown in FIGS. 3A and 3B, are placed within the outer case.

And, when conducting the measurement for the natural vibration spectrum of the outer case of such a battery by means of the hammering test, a first-order peak frequency of the resonance falls in a range of approximately 350 Hz with a favorable noise and vibration property. Also, conducting the test for air flowing from the unit cells to the outside of the outer case results in a confirmation of the ventilation falling in the favorable condition.

EXAMPLE 4

This Example concerns to the structure E previously mentioned above.

In particular, as shown in FIG. 8A, a battery is manufactured in the same way as the Example 2 except for that a total sum of three opening portions 6a, 6b are formed only in one surface, i.e., the top surface 1a of the outer case serving as the metallic support body.

And, when conducting the measurement for the natural vibration spectrum of the outer case of such a battery by means of the hammering test, a first-order peak frequency of the resonance falls in a range of approximately 200 Hz with a favorable noise and vibration property. Also, conducting the test for air flowing from the unit cells to the outside of the outer case results in a confirmation of the ventilation falling in the favorable condition.

EXAMPLE 5

This Example concerns to a modified form of the structure D previously mentioned above.

In particular, as shown in FIG. 1, a battery is manufactured in the same way as the Example 2 except for that opening portions 6 are formed in a total sum of four surfaces, i.e., the top surface 1a, the surface opposed to the top surface, the side surface 1b and the surface opposed to the side surface, of the outer case serving as the metallic support body with a pattern of the opening portions 6 taking the form of the structure D.

And, when conducting the measurement for the natural vibration spectrum of the outer case of such a battery by means of the hammering test, a first-order peak frequency of the resonance falls in a range of approximately 250 Hz with a favorable noise and vibration property. Also, conducting the test for air flowing from the unit cells to the outside of the outer case results in a confirmation of the ventilation falling in the favorable condition.

EXAMPLE 6

This Example concerns to another modified form of the structure D previously mentioned above.

Figure 11:
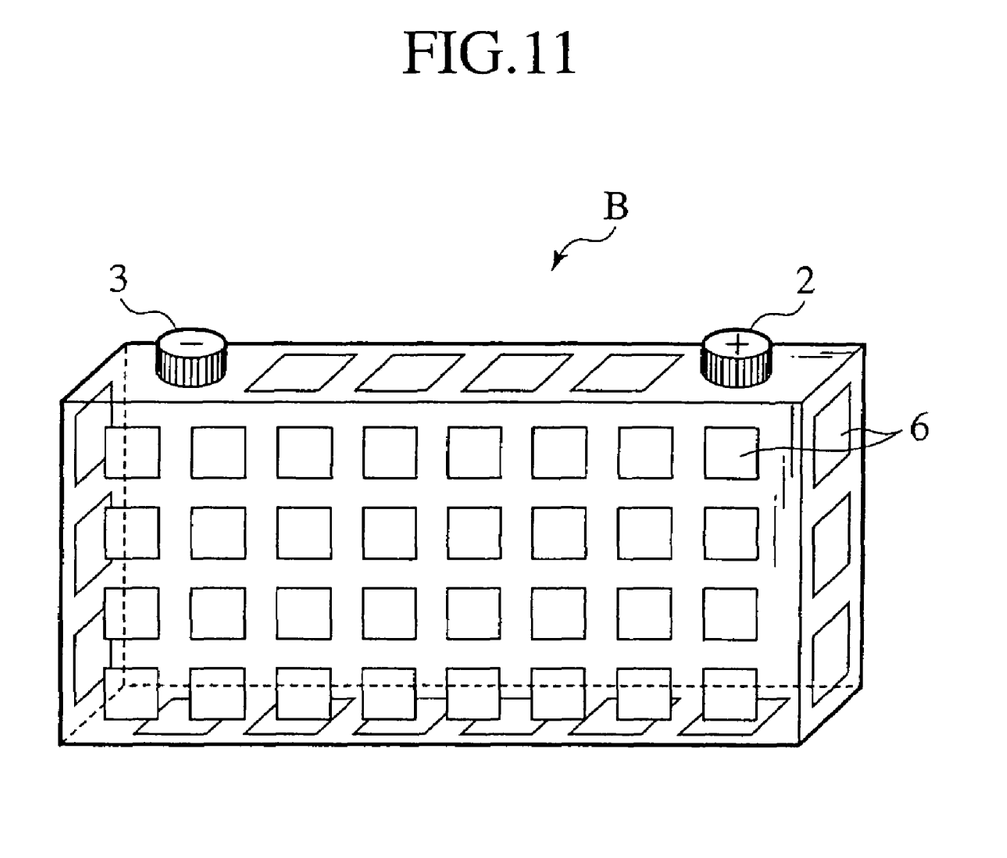
FIG. 11 is a schematic perspective view illustrating a test example of the battery of the present embodiment.

In particular, as shown in FIG. 11, a battery is manufactured in the same way as the Example 2 except for that opening portions 6 are formed in all of six surfaces of the outer case serving as the metallic support body with a pattern of the opening portions 6 taking the form of the structure D.

And, when conducting the measurement for the natural vibration spectrum of the outer case of such a battery by means of the hammering test, a first-order peak frequency of the resonance falls in a range of approximately 250 Hz with a favorable noise and vibration property. Also, conducting the test for air flowing from the unit cells to the outside of the outer case results in a confirmation of the ventilation falling in the favorable condition.

COMPARATIVE EXAMPLE 1

In this Comparative Example, a battery is manufactured in the same way as the Example 2 except for that a single opening portion 6 is formed in the top surface 1a of the outer case serving as the metallic support body such that a resonance loop of such a surface does not appear at an inside area of the opening.

And, when conducting the measurement for the natural vibration spectrum of the outer case of such a battery by means of the hammering test, a first-order peak frequency of the resonance falls in a range of approximately 110 Hz with an unfavorable noise and vibration property. Also, conducting the test of air flowing from the unit cells to the outside of the outer case for confirming a ventilation ability reveals a remarkable reduction in the ventilation rate to provide an unfavorable result.

USUAL EXAMPLE

In this Usual Example, a battery is manufactured in a way as shown by the structure A shown in FIG. 4A such that no opening is formed in the top surface of the outer case serving as the metallic support body and the unit cells are respectively provided in the form of the aluminum cans in two rows with eight series.

And, when conducting the measurement for the natural vibration spectrum of the outer case of such a battery by means of the hammering test, a first-order peak frequency of the resonance falls in a range of approximately 100 Hz with an unfavorable noise and vibration property. Also, when conducting the test of air flowing from the unit cells to the outside of the outer case for confirming a ventilation ability, no ventilation with the outside occurs in an unfavorable result.

The testing results discussed above are shown in the following table 1.

TABLE 1

| | Structure | Number of Surfaces | Unit cell | Note | $1^{st}$-order Peak Freq. | Gas Release |
|---|---|---|---|---|---|---|
| Example 1 | B | 1 | Can Type | Without Resin Group | 200 | ○ |
| Example 2 | C | 1 | Laminated Type | With Resin Group | 220 | ○ |
| Example 3 | D | 1 | ↑ | With Resin Group | 350 | ○ |
| Example 4 | E | 1 | ↑ | With Resin Group | 250 | ○ |
| Example 5 | D FIG. 1 | 4 | ↑ | With Resin Group | 250 | ○ |
| Example 6 | D FIG. 11 | 6 | ↑ | With Resin Group | 250 | ○ |
| Comparative example 1 | — | 1 | Laminated Type | With Resin Group | 110 | X |
| Usual Example | A | — | Can type | Without Resin Group | 100 | X |

As set forth above, the battery according to the present invention has the gas releasing structure and the vibration proof structure, compatible with respect to one another, which are hard to be established in the related art practice, thereby providing a capability of achieving a target performance. Consequently, employing such a battery as a power supply of an electric vehicle, a hybrid vehicle and a fuel cell powered motor vehicle, or a 12V or 24V battery for the motor vehicle enables the electric vehicle, the hybrid vehicle, the fuel cell powered motor vehicle and the usual motor vehicle with a high reliability to be provided.

The entire content of a Patent Application No. TOKUGAN 2001-353499 with a filing date of Nov. 19, 2001 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A method of manufacturing a battery, comprising:
   locating a plurality of unit cells in a support body having an opening portion;
   mounting a plurality of jigs each having a convex portion and a bore at the support body so as to cause the convex portion to be fit into the opening portion of the support body; and
   causing a spacing between the support body and the plurality of the unit cells to be filled with a plastic resin, by charging the plastic resin into the spacing between the support body and the plurality of unit cells through the bore of one jig of the plurality of jigs, while releasing air inside the support body through the bore of another jig of the plurality of jigs that is opposite to the one jig.

2. The method according to claim 1, wherein said opening portion is set substantially at a loop position of a resonance frequency of the surface of the support body.

3. The method according to claim 2, further comprising a plurality of openings set substantially at loop positions of resonance frequencies of the surface of the support body.

4. The method according to claim 3, wherein said support body comprises opposing top and bottom surfaces and opposing lateral surfaces, and said openings are provided in a plurality of the surfaces of the support body.

* * * * *